UNITED STATES PATENT OFFICE.

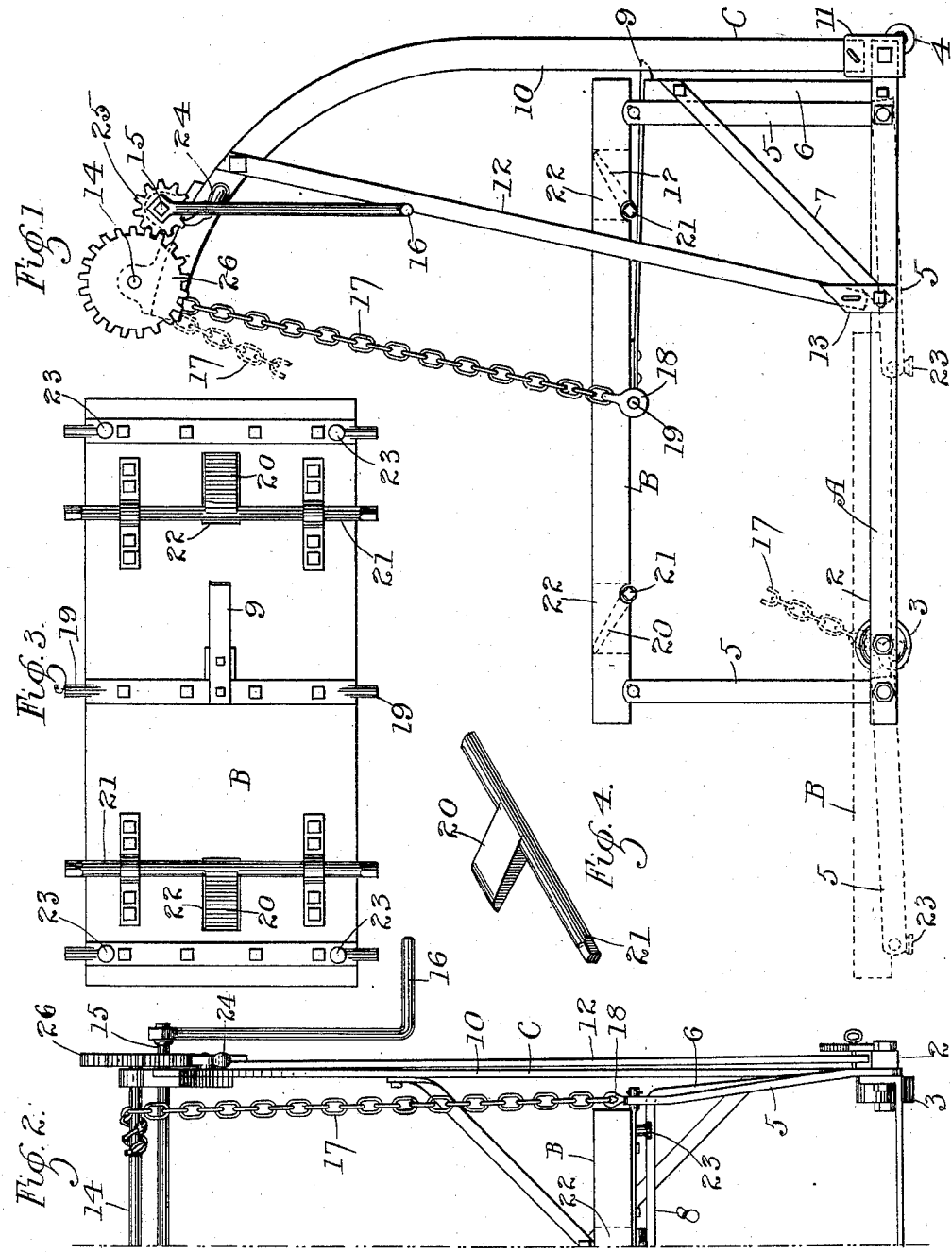

HENRY C. HICKS, OF ST. PAUL, MINNESOTA.

COMBINED BENCH AND TRUCK.

SPECIFICATION forming part of Letters Patent No. 476,268, dated June 7, 1892.

Application filed July 27, 1891. Serial No. 400,863. (No model.)

*To all whom it may concern:*

Be it known that I, HENRY C. HICKS, of St. Paul, Ramsey county, Minnesota, have invented certain Improvements in a Combined Bench and Truck, of which the following is a specification.

My invention relates to improvements in the benches used by stone, marble, and granite cutters for supporting the blocks of material while being worked, its object being to provide a bench the top or platform of which can be readily raised and lowered for the convenient loading and elevation of the block and readily moved about or transported from point to point in the shop.

To this end my invention consists in providing a horizontal frame mounted upon casters or wheels, upon which the platform is supported by means of suitable standards or legs, which are pivoted to the platform and to the frame, thereby permitting the platform to be lowered to the level of the frame by the turning of the legs on their pivots. Removably attached to the horizontal frame is an upright frame, the standards of which are supported in sockets on the horizontal frame. A windlass is journaled upon this upright frame, the chains or cables of which are detachably secured to the opposite sides of the platform near the middle. The upright frame is supported at the rear end of the horizontal frame, but preferably extends forward over it, so that the windlass is very nearly above the points of attachment of the chains to the platform when it is in its raised position.

My invention further consists in providing the platform with pivoted dogs, which may be operated to lift the block of material thereon so as to permit any rollers or other objects to be removed from under it and allow it to rest directly upon the platform or to raise it still higher to receive other props or supports upon the platform.

My invention further consists in the construction and combination hereinafter described, and particularly pointed out in the claims.

In the accompanying drawings, forming part of this specification, Figure 1 is a side elevation of my improved apparatus, the platform being shown in full lines in its elevated position and in dotted lines in its lowered position. Fig. 2 is a partial front elevation of the same. Fig. 3 is a bottom view of the platform, showing the pivoted dogs arranged therein; and Fig. 4 is an isometrical view of one of the dogs and its pivot-shaft.

In the drawings, A represents the horizontal frame of the apparatus, to the front end of the side bars 2 of which the wheels 3 are journaled and at the rear end of which are arranged the casters 4.

The platform-table B, made preferably of soft wood, is supported upon the frame A by means of the legs or standards 5, one at each corner of the platform and parallel with each other. These legs are pivoted both to the frame and to the platform, so that they will permit the platform to be turned forward and downward to the level of the frame A, as indicated by the dotted lines in Fig. 1, the short legs 23 resting upon the ground and supporting the platform, in which position a block of stone or other material can be readily rolled upon it.

At the rear end of the frame A are arranged vertical standards 6, provided with the braces 7 and having the connecting cross-bar or bumper 8, which cross-bar is approximately the height of the under side of the platform B in its highest position. The platform is provided at its rear end with a spring-catch 9, which slides over and engages the cross-bar 8 when the platform is raised, thereby holding it in that position, as shown in Fig. 1.

Arranged also at the rear end of the frame A is the upright frame C, the standards 10 of which are removably secured in sockets 11, carried by the frame A, and are stayed by means of the braces 12, similarly secured in the sockets 13, arranged upon the side bars 2 of the frame A. The standards 10 are curved forward, as shown best in Fig. 1, so that their upper ends extend nearly over the middle of the frame A.

Journaled transversely upon the upper end of the frame C is the windlass 14, to which is geared the crank-shaft 15, provided with a handle 16. The windlass is provided, also, with the chains 17, which are detachably secured at about the middle of each side of the platform by means of eyes 18, which slide over pins 19, secured to the platform.

In loading heavy blocks of stone or similar material upon the platform it is usually necessary to use rollers which need to be removed from underneath the block after it is placed upon the platform. In order to remove these rollers, so that the block may rest firmly upon the bench itself, or in case the block is too low to raise it to convenient height, I provide in the body of the platform near each end a dog 20, which is secured to a pivot-shaft 21, journaled transversely of the platform, and lies normally in an opening or socket 22 in the top of the platform. The end of the shaft 21 is squared, as shown in Fig. 1, so that the handle 16 may be slipped from its shaft and applied to the shaft 21 for the purpose of operating the dog. The shaft 21 being turned by means of the handle, the dog engages and lifts the block and allows the roller or other object beneath it to be removed or a larger one to be substituted for it, after which the block is lowered and the dog drops back into its socket.

In some cases it is desired to hold the platform in a partially-raised or intermediate position. To accomplish this, I provide a pivoted dog 24, adapted to engage the pinion 25 of the crank-shaft and to hold it from reverse movement, thus in turn holding the gear-wheel 26 upon the windlass.

Operation: The platform B being placed in its lower position, as shown by the dotted lines, and the frame C being secured upon the frame A with the chains 17 attached to the platform, the apparatus is rolled up to the block of stone which is to be placed upon it. The stone is then rolled or otherwise placed upon the platform, when, by the turning of the handle 16 upon the shaft 15, the platform is lifted, its legs turning upon their pivots until it reaches its highest position, as shown in Fig. 1, when the catch 9 slides over and engages the cross-bar or bumper 8, thus holding the platform firmly in position. The chains 17 are then detached from the platform and the frame C lifted out of its sockets, in which it is held upon the frame A. The handle 16 then being removed from the shaft 15 is applied in turn to each of the shafts 21, and the dogs 20 are turned to lift the block and permit the rollers underneath the same to be removed. The block then rests upon the bench firmly and in readiness to be cut by the workmen. When the work has been finished, the standard C is replaced, the chains 17 again attached, the platform lowered, and the block removed.

I claim—

1. In a device of the class described, the combination, with a suitable horizontal frame, of a platform supported thereon upon parallel legs pivoted to both, an upright frame detachably secured to said horizontal frame, a windlass carried by said upright frame, chains from said windlass detachably connected to said platform, and means for securing said platform in its raised position, substantially as and for the purposes set forth.

2. The combination of the horizontal frame, the platform supported by parallel pivoted legs upon said frame, a catch upon said platform engaging a cross-bar carried by said frame when the platform is in its raised position, and a windlass removably supported above said platform having its chains detachably secured to the same, substantially as and for the purposes set forth.

3. The combination, with the wheeled truck having a windlass removably supported above the same, of a platform supported upon parallel legs pivoted to it and said truck, chains detachably connecting said platform with said windlass, and means for holding said platform in its raised position, substantially as and for the purposes set forth.

4. The combination, with the wheeled truck, of the bench or platform supported thereon by parallel legs pivoted to both, a windlass removably arranged upon said truck above said platform, having its chains connected to said platform, and means for locking said platform to the frame of said truck in a raised position, substantially as and for the purposes set forth.

5. The combination, with a stone-cutter's bench, of a rock-shaft journaled thereon, and a lifting-dog secured to said shaft, lying normally below the top of the bench and adapted to be thrust above the truck by the rocking of said shaft, so as to lift a superincumbent block, substantially as set forth.

6. The combination, in a stone-cutter's bench, of a horizontal vertically-adjustable platform, an upright frame removably attached to one end of the bench and overhanging the platform, a windlass carried by said upright frame, and chains connecting said windlass with said platform, substantially as and for the purposes set forth.

7. The combination, with a suitable frame, of the vertically-adjustable platform supported thereon, the windlass supported upon said frame and overhanging said platform, and chains connecting said windlass to said platform, substantially as described.

8. The combination, with a stone-cutter's bench, of a transverse rock-shaft journaled thereunder and projecting beyond the edge of the bench, a lifting-dog upon said shaft adapted to be projected above the top of the bench by the turning of the shaft, and a recess in the bench to receive said dog when turned downward below the surface, substantially as described.

In testimony whereof I have hereunto set my hand this 23d day of July, 1891.

HENRY C. HICKS.

In presence of—
T. D. MERWIN,
A. MAE WELCH.